Sept. 30, 1969 W. R. CAPUTO 3,470,434

ELECTRICAL DRIVE AND METHOD OF OPERATING SUCH DRIVE

Filed Sept. 9, 1966 8 Sheets-Sheet 1

WITNESSES

Theodore T. Wrobel

James F. Young

INVENTOR

William R. Caputo

BY C. L. Freedman

ATTORNEY

Sept. 30, 1969 W. R. CAPUTO 3,470,434

ELECTRICAL DRIVE AND METHOD OF OPERATING SUCH DRIVE

Filed Sept. 9, 1966 8 Sheets-Sheet 2

United States Patent Office 3,470,434
Patented Sept. 30, 1969

3,470,434

ELECTRICAL DRIVE AND METHOD OF OPERATING SUCH DRIVE

William R. Caputo, Jersey City, N.J., assignor to Westinghouse Electric Corporation, Pittsburgh, Pa., a corporation of Pennsylvania Filed Sept. 9, 1966, Ser. No. 583,146
Int. Cl. H02p 5/20, 5/22
U.S. Cl. 318—146 7 Claims

ABSTRACT OF THE DISCLOSURE

An electrical MG-set drive for an elevator is disclosed in which the field of the generator is supplied through silicon-controlled rectifiers connected to supply the fields in opposite directions in accordance with the demands of the elevator cars for being moved up or down or being held at selected levels or having their speeds reduced. Smooth control is achieved by controlling the rectifiers which conduct oppositely so that they can conduct simultaneously in opposite directions, during transitions from field current of one polarity to the opposite polarity, while the field current is low, the decaying current still flowing through the field and the increasing current flowing through resistance until it takes over. The rectifiers of unselected polarity are locked out at normal drive field current by saturation of the firing current transformer of each rectifier by the normal current flow of the opposite polarity through the field. Each firing transformer includes a coil in the field circuit which saturates it for normal current flow opposite to the polarity of the rectifier which it fires.

This invention relates to electrical drives and has particular relationship to drives for such apparatus as elevators. The drive of an elevator is subjected to loading which varies over a wide range both as to direction and as to speed but most operate so that, in spite of these wide variations, the driven apparatus will respond smoothly and follow closely the desired motion. It is an object of this invention to provide a drive which shall accomplish this purpose and, typically, when driving the cab of an elevator shall move this cab smoothly and evenly from floor to floor.

The drive of each cab of an elevator typically includes, in the penthouse of an elevator system, a drive motor energized from a motor-generator set. The drive motor is coupled to the cables which carry the cab directly, where it is of relatively low speed, or through gearing, where it is of relatively high speed. The generator of the set has a shunt field which is controlled to control the speed and direction of the drive motor.

In accordance with the teachings of the prior art, the field is controlled typically by a Rototrol amplifier or other rotating amplifier or by a Silverstat control. While this prior art apparatus has operated satisfactorily, it is desirable, in the interest of economy and improved reliability, to eliminate the moving mechanisms in the control of the drive and it is an object of this invention to accomplish this object. It has been realized that the moving control mechanisms of the drive control can be replaced by solid-state devices which are relatively small and reliable and are capable of effectively setting the speeds of a generator over a wide range by setting the field current. But it has been discovered that the mere equivalent-item-for-equivalent-item substitution of a solid-state control for the moving-mechanism control of the prior art does not yield the desired smoothness in the operation of the driven apparatus. A cab moved, as demanded in service upwardly and downwardly and at changing speeds, by a drive including merely solid-state components in place of equivalent mechanical components has a jerky motion disagreeable to the occupants of the cab. The stopping of this cab at times subjects the occupants to disagreeable mechanical shocks. It is an object of this invention to overcome the above-described deficiencies of a solid-state control and to provide a drive for an elevator system or the like in whose use the elevator cabs or like driven components shall be moved and stopped smoothly and without subjecting the occupants of the cabs to disagreeable mechanical shocks.

For understanding of this invention it is desirable first to consider in detail the variety of loads to which the drive of an elevator cab may be subjected. A cab at rest at a level must be held at the level which it is occupying against gravity by the drive as well as the brake because the floor-levelling mechanism operates through the drive to maintain the cab at the landing level. The pull exerted by the drive is variable and depends on the passenger loading of the cab. This requires that the generator impress a holding voltage on the motor. When the cab is then moved it initially leaves the landing at a low speed but soon reaches a relatively high speed. The drive is controlled from a pattern voltage in carrying out this operation. If the cab is moved in an upward direction the energization of the generator must be increased from the rest energization, in accordance with the pattern voltage, to increase the voltage on the motor. If the cab is to moved downwardly, the holding energization of the generator must be converted into a downward acceleration. Both for upward and for downward movement the energization depends on the passenger loading and may vary from a low magnitude for an empty cab or one or two passengers to a high magnitude for a cab filled with passengers. The drive may then be subjected to gradual or abrupt variations in excitation of a set polarity or gradual or abrupt reversal of excitation.

Smooth movement of an elevator cab controlled from solid-state components must be achieved by appropriate coordination of the control of the components with the demands of the load and this is the basic object of this invention. Of importance in meeting this object is the realization that there is no one-to-one correspondence between the speed and direction of the cab and the polarity and magnitude of energization of the drive. With the cab at rest the drive is variably energized to exert a variable balancing and leveling pull on the cab. When the cab reaches a high speed in the upward or downward direction the energization of the drive is reversed to stabilize the speed. The energization of the drive is thus frequently reversed. It has been discovered that during the reversing episode the control commands for the opposite polarity energizations must overlap but the overlap cannot be achieved simply by energizing at random solid-state amplifiers conducting field current in opposite directions. Such energization short-circuits the supply and damages the amplifiers.

In the practice of this invention, the field current of the motor-generator set is controlled through sets of one or more valves, which may be of any suitable type such as ignitrons or thyratrons but specifically are silicon-controlled rectifiers. The rectifiers are respectively poled to conduct current of one polarity and of the opposite polarity. In accordance with this invention, the conduction of the sets of valves overlaps but mutually and precisely control each other so that they both conduct only when their currents are low and only one conducts when its current is substantial. The control is effected by imposing a control on the valves conducting the field current of one polarity in dependence upon the current conducted in the opposite polarity.

In the normal operation of a drive in accordance with this invention, when selected silicon-controlled rectifiers are conducting substantial current of one polarity, any tendency to conduct current in the opposite direction by nonconducting rectifiers is suppressed responsive to the current flow through the field in the desired direction. In the transition when the field current is being reversed, the initially conducting silicon controlled rectifiers conduct very low current. During this transition the silicon-controlled rectifiers which are to take up the conduction of the current in the opposite direction are also rendered conducting but initially conduct current of low magnitude. But as the conduction of initially conducting rectifiers decays to zero, the conduction of the silicon controlled rectifier increases and the conduction of the initially conducting rectifiers is suppressed so that ultimately when the field current reaches a substantial magnitude of the opposite polarity, only the silicon-controlled rectifiers conducting the new-polarity current are capable of conducting and the conduction through the others is suppressed. Because the conduction during the overlapping interval is low, short-circuiting is avoided.

Specifically the firing potential for each set of silicon controlled rectifiers is derived through a separate transformer unit. And in accordance with this invention a novel such unit is provided which operates effectively to control the rectifiers. The transformer unit for each set of rectifiers includes a saturating coil through which the field current conducted by the other set of rectifiers flows. Because it is dimensioned to conduct the field current the coil is large and has a large core with an air gap. The firing transformer which is small is interposed in the air gap with its core in flux interchange relationship with the core of the coil. The transformer of each unit is saturated by the conduction of normal field current through the silicon controlled rectifier fired by the other transformer unit but becomes unsaturated when this field current drops to a low magnitude. With a firing transformer saturated the firing of the associated silicon-controlled rectifier is suppressed. When at low currents the transformer is unsaturated, the firing potential passes through the transformer and firing potential is impressed on the associated silicon controlled rectifier. At low currents then the silicon-controlled rectifiers of both sets conduct the field current in both directions. In this way, the overlap conduction is effectively controlled and the transition of the drive from one driving direction to the other is smooth.

For a more complete understanding of this invention, both as to its organization and as to its method of operation together with additional objects and advantages thereof, reference is made to the following description taken in connection with the accompanying drawings, in which.

Figure 3:
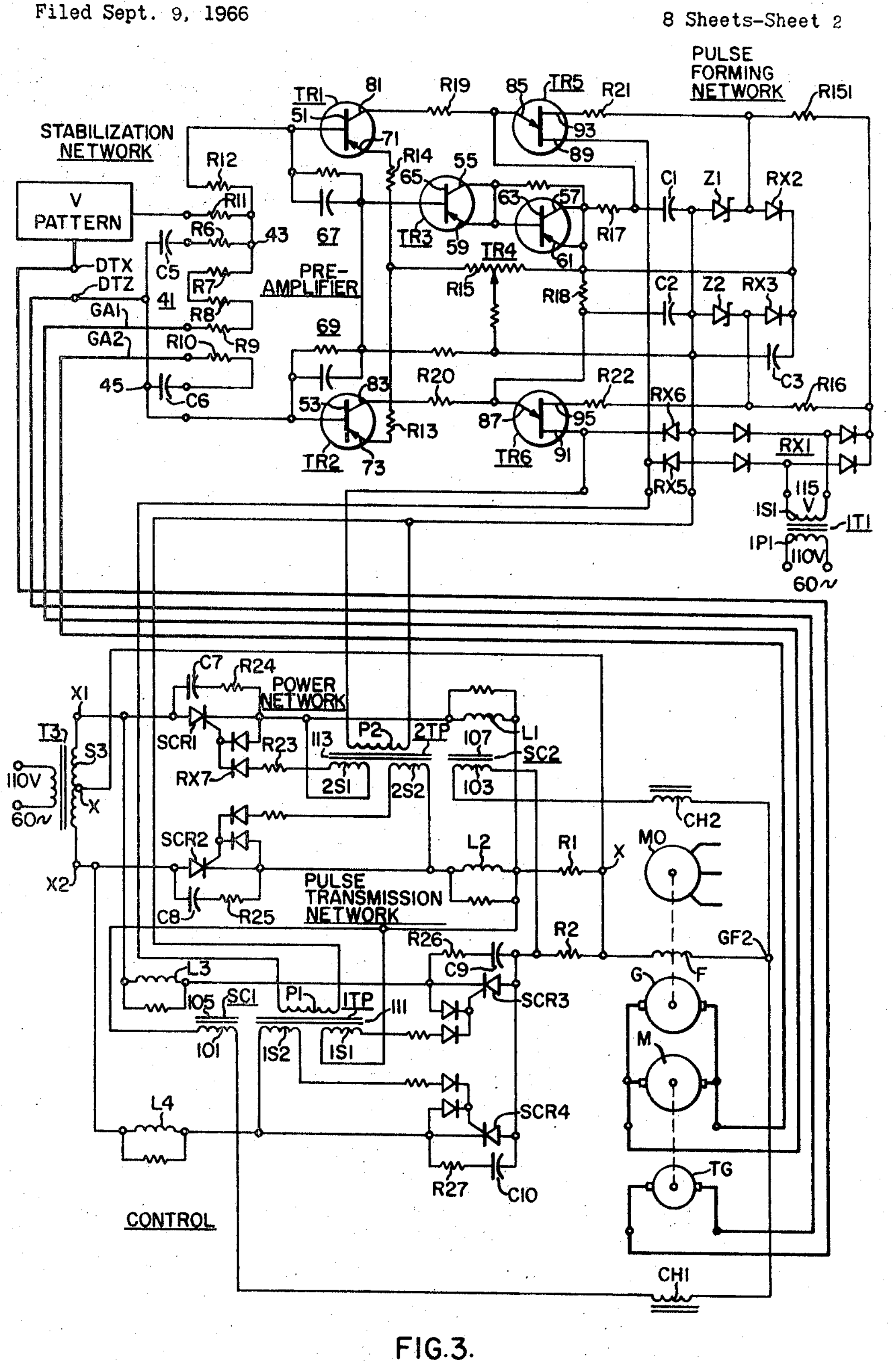
FIG. 3 is a schematic showing the control according to this invention.

FIGS. *5a* through *5n* are graphs showing the various voltages impressed on the apparatus shown in FIG. 3 and their relationship during operation in accordance with this invention.

Figure 6:
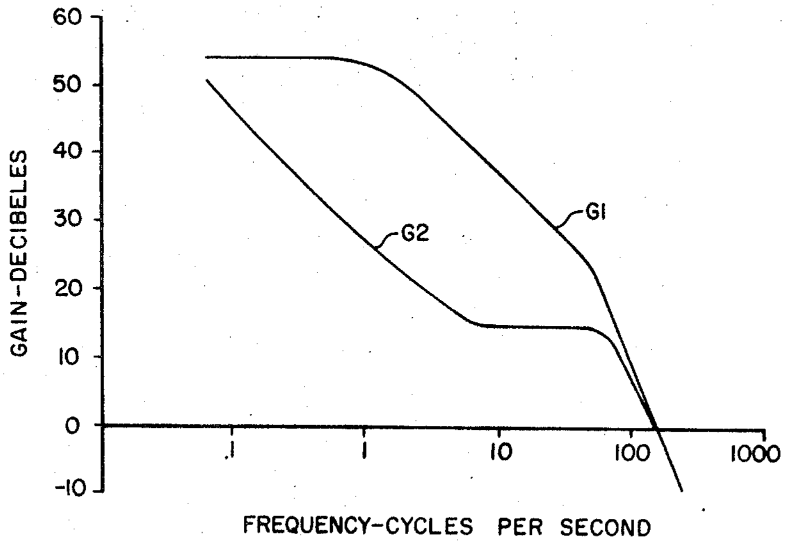

FIG. 6 is a graph showing the effect of the Stabilization Network used in the practice of this invention on the gain of the Control.

Figure 7:
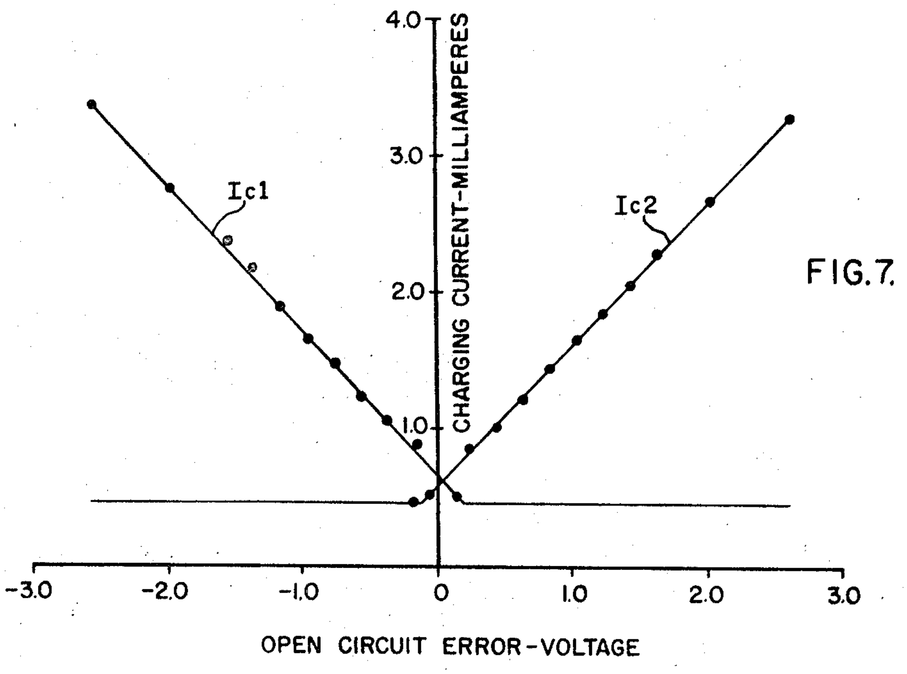

FIG. 7 is a graph showing the relationship between the input error voltage and the resulting current flowing through the Pulse Forming Network.

Figure 8:
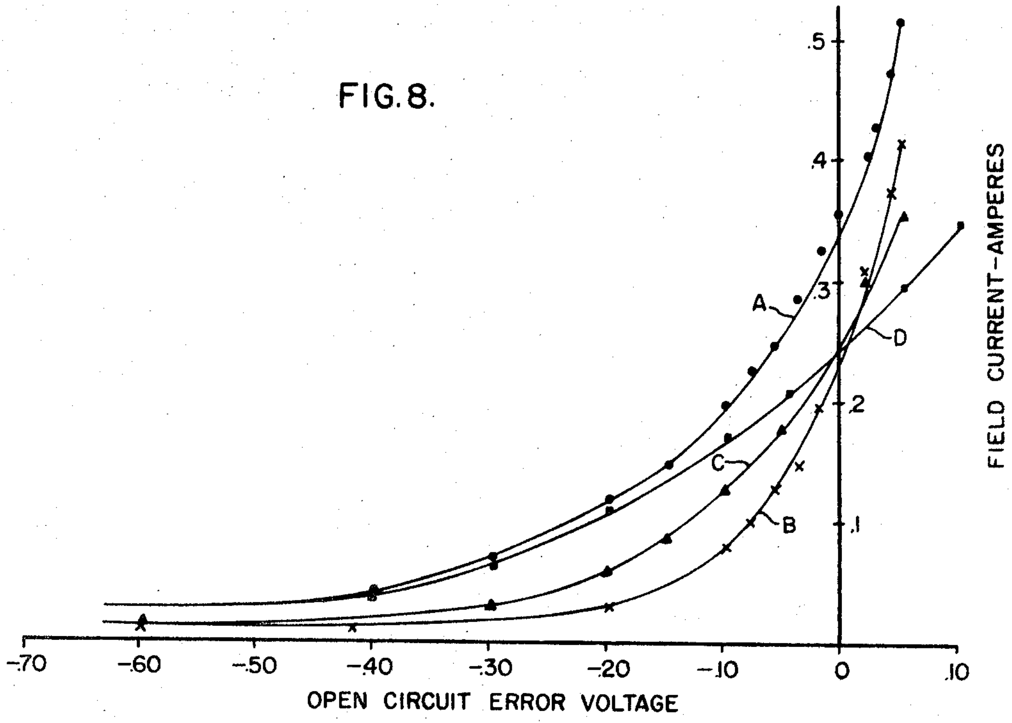

FIG. 8 is a graph showing the relationship between the bias impressed on the Preamplifier and the resulting generator field current.

Figure 9:
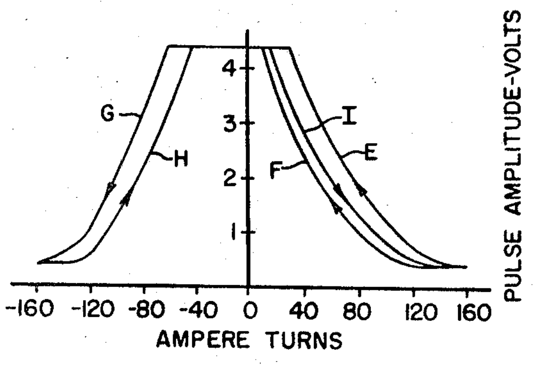
Figure 9A:
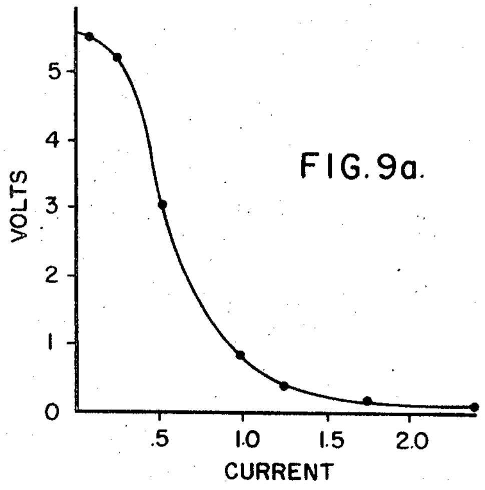

FIG. 9 is a graph showing the relationship between the ampere turns through the saturating coil of a transformer unit and the resulting amplitude of the firing or triggering pulses for each of the silicon controlled rectifiers.

FIG. *9a* is a graph showing the relationship between the current through the saturating coil of an up-to-date transformer unit used in the actual practice of this invention, and the pulse amplitude.

Figure 10:
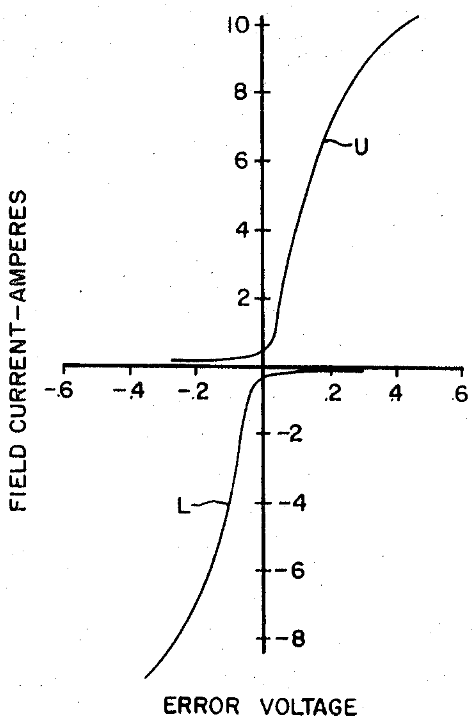

FIG. 10 is a graph showing the relationship, for each polarity of generator field current, between the error voltage and the resulting field current.

Figure 11:
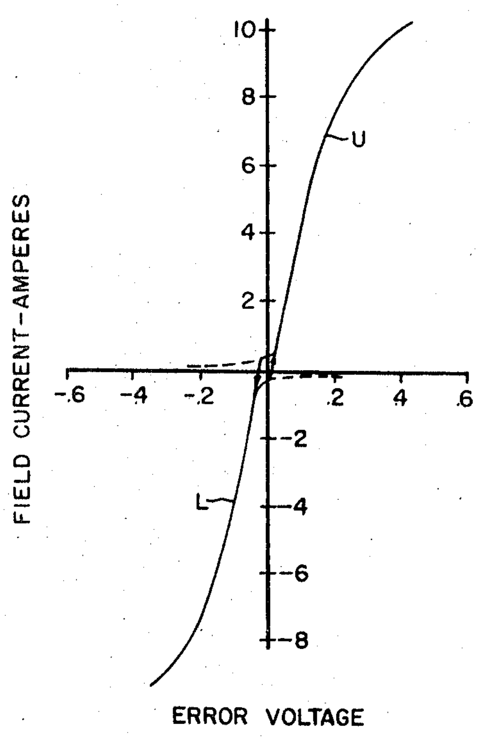

FIG. 11 is a graph similar to FIG. 10 showing the manner in which the field current changes with error volts for the normal connection.

Figure 12:
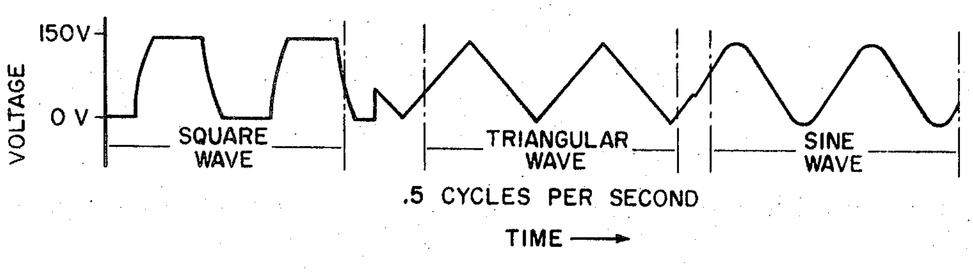

FIG. 12 is a copy of an oscillograph demonstrating the operation of this invention.

Figure 13:
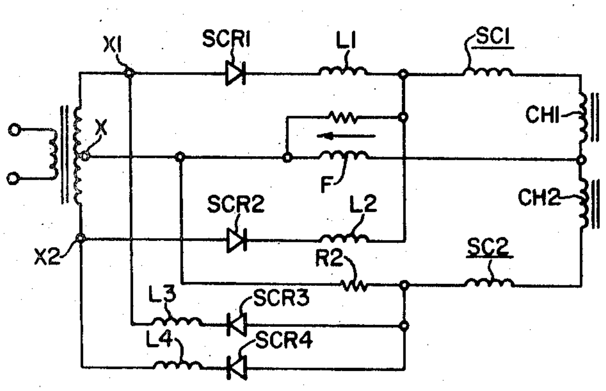

FIG. 13 is a schematic showing the important features of the Power Network to enhance understanding of this invention.

Figure 4:
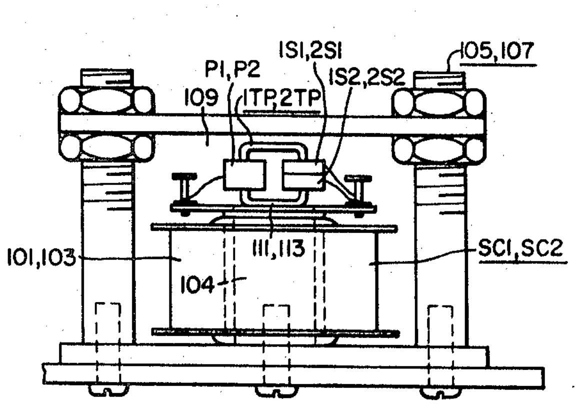
FIG. 4 is a generally diagrammatical view showing the main features of the firing transformer unit in accordance with this invention.
Figure 15:
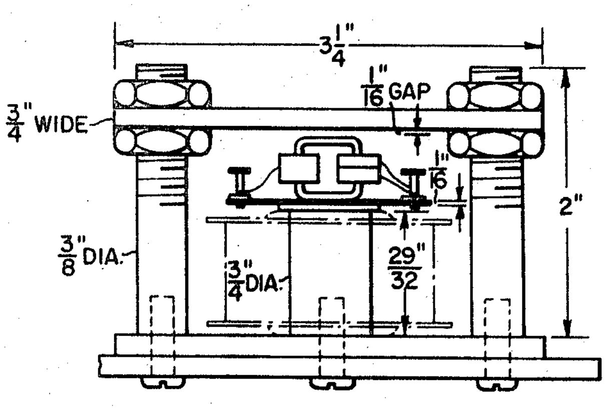
Figure 14:
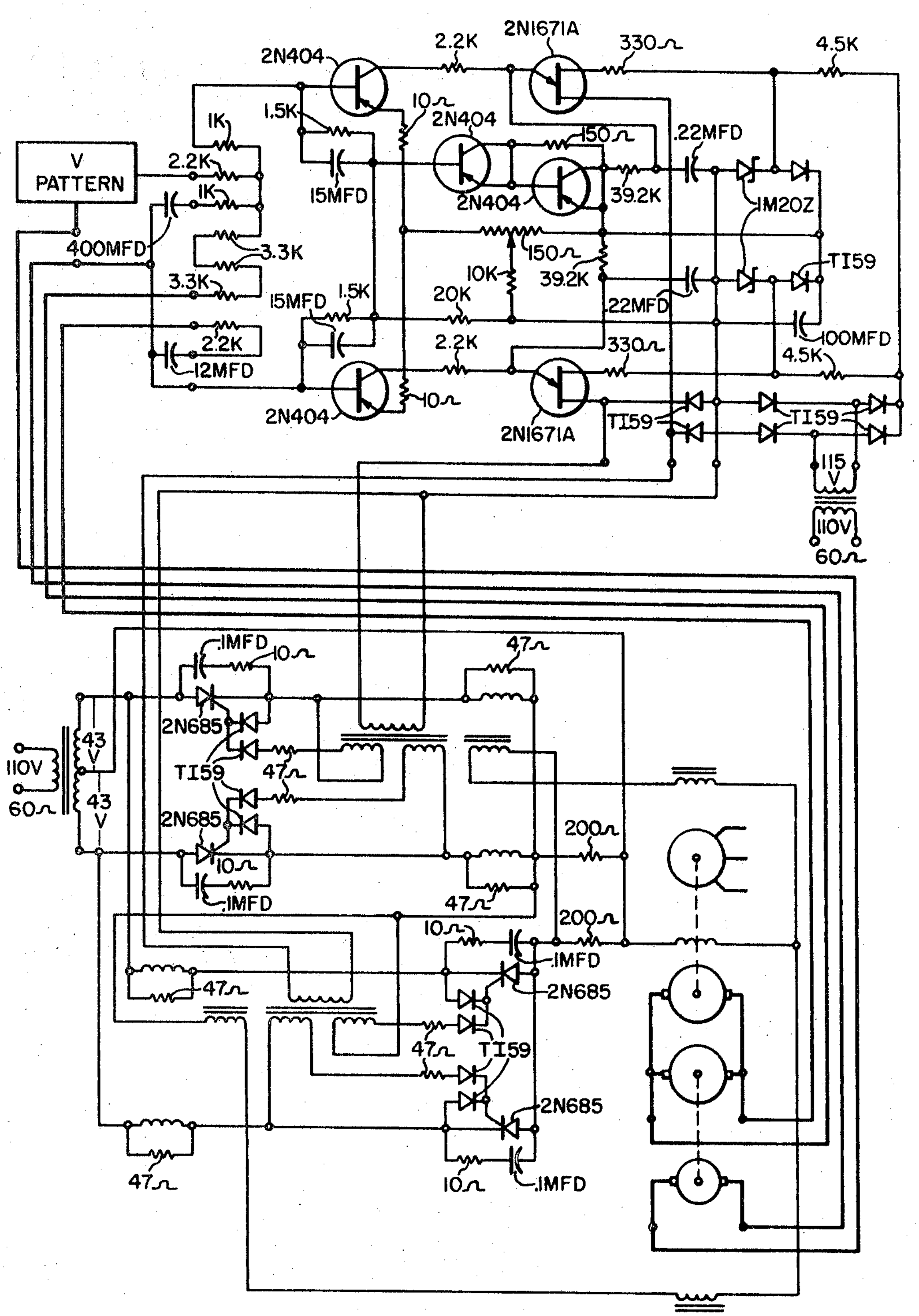

FIG. 14 is a schematic similar to FIG. 3 but showing the actual components used successfully in the practice of this invention; and FIG. 15 is a schematic generally similar to FIG. 4 but showing the important dimensions of a transformer unit used in the practice of this invention.

FIGS. 14 and 15 are included for the purpose of aiding those skilled in the art to practice this invention and not with any intention of in any way restricting this invention.

Figure 1:
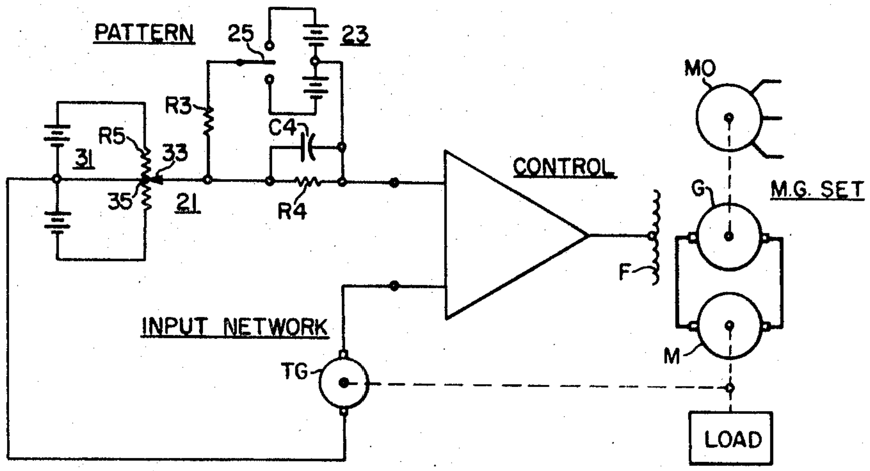
FIGURE 1 is a diagrammatic view showing the principal components of apparatus in accordance with this invention and their relationship.

Typically in an elevator system to which this invention is applied there is included (FIG. 1) an MG-Set, a Control and an Input Network. The MG-Set includes a generator G having a shunt field F supplied by the Control. The armature of the generator G is driven by a Motor MO which may be a three-phase induction motor. The generator G supplies voltage to the armature of a drive motor M which drives the load, typically a cab of an elevator system. A tachometer generator TG is connected to the motor M and produces a voltage proportional to the speed of this motor. This generator TG is connected to impress its voltage in the Input Network.

In the practice of this invention, the operation of the Control is dependent on an error potential supplied by the Input Network. In the Input Network a pattern voltage set in accordance with the requirements of the load is compared with the output voltage of the tachometer generator TG. This pattern voltage is derived from a network 21 including selector means which may be set to impress a voltage of one polarity or the other in the Input Network in dependence of the direction in which it is desired that the motor M be driven. Typically this network 21 supplies two components of pattern voltage; one for determining the direction of the motor M and the other for balancing the position of the cab at a landing. The first voltage is derived from a center-tapped voltage supply 23 which may be selectively connected into the Input Network by a contact 25 of a timing relay (coil not shown) that determines the desired direction of the motor M. The voltage from the center-tapped supply 23 is impressed in the Input Network through a resistor R3 and a network including a resistor R4 shunted by a capacitor C4. The other component of pattern is supplied by a variable resistor R5 having a center tap which is connected across a second center-tapped power supply 31 with the center tap of the resistor R5 connected to the center tap of the supply 31. The movable arm 33 of this variable resistor R5 is operated in dependence upon the movement and position of the elevator cab (not shown) and its setting to one side or the other side of the center tap 35 depends on the setting of the cab with respect to the landing. The variable resistor R5 introduces a voltage serving to center the cab automatically at the landing. The net potential derived from the pattern network 21 is impressed in series with the tachometer generator TG so as to counteract the voltage of the generator TG.

The Control (FIGS. 2 and 3) includes a Stabilization

Network, a Preamplifier, a Pulse Forming Network, a Pulse Transmission Network and a Power Network. The Stabilization Network includes a bridge 41 having a pair of capacitors C5 and C6 and a plurality of resistors R6, R7, R8, R9 and R10. The error voltage is impressed through resistor R11 between conjugate terminals 43 and 45 of the bridge 41. The voltage which appears across the motor M is impressed through conductors GA1 and GA2 between resistor R9 and R10. These voltages are impressed oppositely so that any tendency of the drive-motor voltage to respond sharply to a sharp increase in error voltage is counteracted by the corresponding increase in this voltage.

One of the capacitors C5 has a capacitance of substantial magnitude of the order of 400 microfarads; the other, C6, is substantially smaller of the order of 4 microfarads. The resistors R7, R8, R9, connected between the capacitor C5 and one motor terminal have resistances about five times as large as the resistor R10 connected between the capacitor C6 and the other motor terminal.

The Stabilization Network effectively flattens abrupt response of the apparatus in accordance with this invention. This is demonstrated in FIG. 6 in which the overall gain of the apparatus in decibels is plotted vertically as a function of the frequency of the error voltage. Curve G1 corresponds to operation without the Stabilization Network and curve G2 to operation with the Stabilization Network. FIG. 6 shows that over the range between approximately $\frac{1}{10}$ cycles per second and 60 cycles per second the gain with the Stabilized Network in operation is substantially smaller than the gain without the network.

The Pre-Amplifier includes a pair of transistors TR1 and TR2. The output conjugate terminal 43 of the Stabilizing Network is connected to the base 51 of one of the transistors TR1 through a resistor R12 and conjugate terminal 45 directly to the base 53 of the other. The Pre-Amplifier also includes an additional pair of transistors TR3 and TR4 similar to those connected to the Stabilization Network. The collector 55 and emitter 59 of transistor TR3 and collector 57 and emitter 61 of transistor TR4, respectively, are connected together and the common junction of the collector 55 and emitter 59 of transistor TR3 is connected to the base 63 of TR4. The base 65 of the transistor TR3 is connected to the bases 51 and 53 through filters 67 and 69. The transistors TR3 and TR4 serve to compensate for temperature variations of the Pre-Amplifier.

The emitters 71 and 73 of the transistors TR1 and TR2 are connected together through resistors R13 and R14 and this common juncture is connected to a variable resistor R15. This resistor R15 is set to obtain the characteristic such as depicted in FIG. 11. The temperature compensation achieved with the transistors TR3 and TR4 connected through the filters 67 and 69 effectively maintains the desired characteristic from −10° C. to 70° C. ambient.

Figure 5:
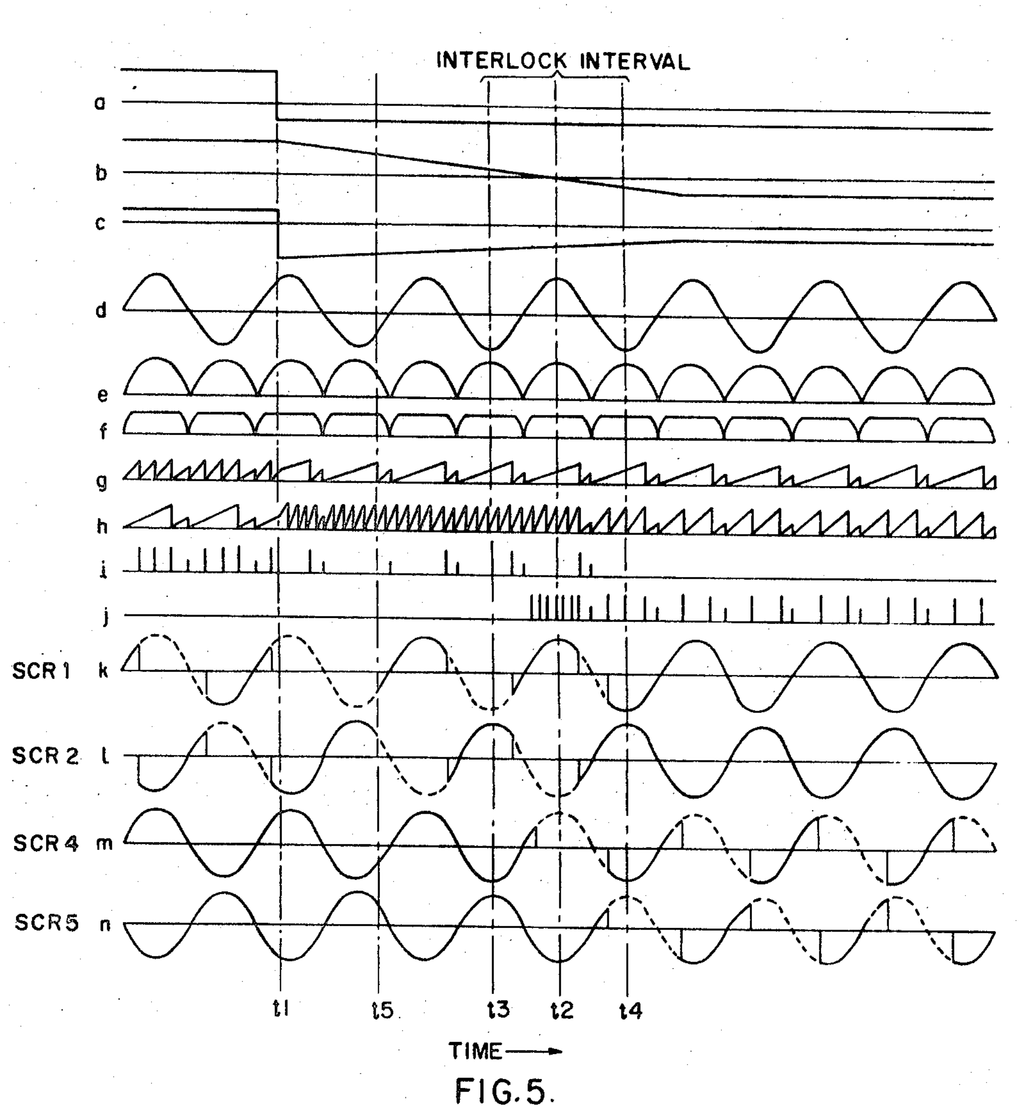

The energizing potential for the transistors TR1 and TR2 is derived from a supply which also serves to energize the Pulse Forming Network. This supply includes a transformer 1T1 having a primary 1P1 connected to a commercial alternating current source and a secondary 1S1. The secondary 1S1 supplies a bridge rectifier RX1. The bridge rectifier RX1 converts the potential from the transformer 1T1 into successive half waves of the same polarity. These half waves are conducted through resistors R15 and R16 and rectifiers RX2 and RX3 respectively to charge the capacitor C3. The charging is in each case limited by a Zener diode Z1 and Z2 connected between the negative terminal of the rectifier bridge RX1 and the rectifiers RX2 and RX3 respectively. Typically the Zener diode may break down for a potential of the order of 20 volts so that during the successive half period of the supply derived from the transformer 1T1, the capacitor C3 is charged by a potential having a trapezoidal waveform with a relatively long upper base (FIG. 5*f*). The positive plate of capacitor C3 is connected to variable resistor R15 and through this resistor to the emitter 71 and 73 of the transistors TR1 and TR2. The negative plate of C3 is connected to the corresponding collectors 81 and 83 through capacitors C1 and C2 respectively of the Pulse Forming Network.

The Pulse Forming Network includes, in addition to the capacitors C1 and C2, the unijunction transistors TR5 and TR6. Each transistor TR5 and TR6 includes an emitter 85 and 87, a first base 29 and 91, and a second base 93 and 95. In the operation of a unijunction transistor conduction abruptly takes place between the emitter and first base when the potential between the emitter and second base reaches a predetermined fraction of the potential between the bases. A constant bias potential is impressed on the capacitors C1 and C2 from the capacitor C3 in the following circuits: Positive plate capacitor C3, high resistors R17 and R18, capacitor C1 and capacitor C2 respectively, negative plate capacitor C3. Capacitor C1 is also charged with potential dependent on the conduction of the associated transistor TR1 in the following circuit: Positive plate capacitor C3, variable resistor R15, emitter 71, collector 81, collector resistor R19, capacitor C1, negative plate cacacitor C3. Capacitor C2 is charged in a corresponding circuit including the emitter 73 and collector 83 and collector resistor R20. A ramp function or trapezoidal waveform potential is impressed between the bases 89 and 93 of the unijunction transistor TR5 in the following circuit: The positive pole of the bridge RX1, resistor R151, resistor R21, the primary P1 of the associated pulsing transformer 1TP, to the negative pole of the bridge. This potential is limited by the Zener diode Z1. Ramp function potential is impressed between the bases 91 and 95 in an analogous circuit including resistor R22 and the primary P2 of the pulsing transformer 2TP. The potential which determines the instant conduction of the unijunction transistors TR5 and TR6 is derived from the capacitors C1 and C2. This potential for the transistor TR5 is impressed in the following circuit: The positive plate of capacitor C1, emitter 85, base 89, primary P1, negative plate of capacitor C1. Analogously, the corresponding potential for transistor TR6 is impressed in circuit: Positive plate of capacitor C2, emitter 87, base 91, primary P2, negative plate of capacitor C2. The charge on capacitors C1 and C2 includes the bias provided through the associated resistor R17 and R18 and the variable potential which increases in dependence upon the conduction of the associated transistor TR1 and TR2. When this potential reaches a magnitude corresponding to the fraction of the base potential for which a unijunction transistor TR5 or TR6 is set to conduct, the transistor conducts and supplies a pulse through the associated primary P1 or P2 as the case may be. To suppress any tendency of the capacitors C1 and C2 to be charged to the opposite polarity by the inductive effects of primaries P1 and P2, rectifiers RX5 and RX6 are connected across primaries P1 and P2 so poled as to absorb the potential produced by this inductive effect.

FIGS. 7 and 8 are graphs which show characteristics of the Pre-Amplifier and its relationship to the Pulse Forming Network. In FIG. 7, the charging current for capacitors C1 and C2 in milliamperes through each of the associated transistors TR1 and TR2 is plotted as a function of the open-circuit error voltage. Curve *I*c1 presents the current for C1 and curve *I*c2 to C2. There is appreciable charging current at zero error signal and this charging current may be set by setting the variable resistor R15 connected to the emitter 71 and 73. The zero-error current determines the extent of the overlap in the charging of the capacitors C1 and C2. In FIG. 8 the generator field current is plotted vertically as a function of the open-circuit error voltage for various emitter resistances R15. Curve A corresponds to a circuit (not shown) in which separate variable resistors are connected to each of the emitters 71 and 73. Curve B corresponds to a circuit in which the variable resistance R15 is substantially the only resistance in circuit with the emitters 71 and 73. This is the situation in the apparatus shown in FIG. 14 in which resistors R13 and R14 of only 10 ohms are interposed between the variable resistor R15 of 150 ohms and each of the emitters 71 and 73. Curve C corresponds to the situation in which a resistance of 100 ohms (not shown) is interposed between the variable resistor R15 and the emitters 71 and 73. Curve D corresponds to the situation in which a resistance of 330 ohms (not shown) is connected between the variable resistor R15 and each emitter 71 and 73. Of the curves A through D, curve B is preferred since the field current decreases most sharply as the error-signal decreases.

The Pulse Transmission Network includes the transformer unit, each unit including transformer 1TP and 2TP and a saturating coil SC1 and SC2 respectively (FIG. 4). Each saturating coil SC1 and SC2 includes a shell type magnetic core 105 and 107 having a winding 101 and 103 and its outer leg 104 having a gap 109. The current through the winding 101, 103 produces flux in the core which passes through the gap. Each pulse transformer 1TP and 2TP includes the primary P1 and P2 respectively and a pair of secondaries 1S1 and 1S2 and 2S1 and 2S2 respectively. Each pulse transformer also includes a core 111 and 113 of generally oval shape which threads the primary P1 and P2 and the secondaries 1S1 and 1S2 and 2S1 and 2S2. The core 111, 113 is interposed in the gap 109 of the associated saturating coil SC1 and SC2 and is threaded and may be saturated by the flux in the gap 109 produced by the associated coil SC1 and SC2. The core 111, 112 of the pulse transformer 1TP, 2TP is preferably of ferrite. The normal field current transmitted through the winding 101, 103 of a saturating coil causes the core 111, 113 of the pulse transformer to be saturated and suppresses the transmission of any pulses impressed on its primary P1, P2.

Since each pulse transformer 1TP, 2TP need only conduct the control current for the silicon controlled rectifiers SCR1, SCR2, SCR3 and SCR4, it may be very small. Actually the core 111, 113 of the pulse transformer may have a length of about ⅜ of an inch and the width and thickening of the flux path may be about ⅛ inch. The primary and secondary windings P1, 1S1, 1S2, P2, 2S1, 2S2 threaded by this core 105, 107 may have a diameter of about ¼ inch. While the saturating coils SC1 and SC2 are integral parts of the transformer unit they are wound separately from the pulse transformer 1TP, 2TP, because they are connected to conduct the generator field current and their windings must be composed of wire of substantial diameter. The pulse transformers 1TP and 2TP are integrated into the cores of the associated coils as disclosed herein. In the use of the transformer unit pulses derived from the capacitors C1 or C2 are transmitted through the primaries P1 or P2 when the associated unijunction transistor becomes conducting. These pulses induce secondary pulses when the core 101 and 103 of a transformer 1TP and 2TP is unsaturated.

FIG. 9 presents the properties of a typical transformer unit. This figure is a graph which was produced by impressing a pulse of about 4½ volts on the primary P1, P2 of a pulse transformer 1TP, 2TP and observing the potential of the pulse at the output for different ampere turns through the coil SC1, SC2. In actual practice one of the saturable coils SC1 conducts current of one polarity and the other coil SC2 conducts current of the opposite polarity so that the apparatus in accordance with this invention does not precisely duplicate the conditions under which FIG. 9 was prepared. In the apparatus for which FIG. 9 was produced, the air gap between the core 105, 107 of the saturating coil SC1, SC2 and the core 101, 103 of the transformer 1TP, 2TP was of the order of .030 inch.

In FIG. 9 the voltage of the pulse at a secondary is plotted vertically and the ampere turns through the saturating coil horizontally. FIG. 9 shows that at zero ampere turns the pulse has an amplitude of about 4.3 volt. As the current is increased in the positive direction, the pulse retains its amplitude until the ampere turns reach a magnitude of 30. Thereafter, the amplitude decreases along the outside branch E of the curve in the right-hand quadrant reaching a low magnitude at about 160 ampere turns. Succeeding decrease in the ampere turns through the saturating coil causes the pulse amplitude to follow the inner branch F in the right-hand quadrant of FIG. 9. As the ampere turns are further decreased to zero and then increased at opposite polarity the pulse amplitude increases from the low saturation magnitude of about ½ volt to the magnitude of 4.3 volts as the ampere turns are decreased from 160 to 0 and then continues at 4.3 volts until the polarity of the ampere turns is reversed and the ampere turns are increased to about 60. Thereafter as the ampere turns are increased the polarity of the pulse decreases to less than about ½ volt. At this point reduction of the ampere turns causes the amplitude of the pulse to follow the branch H in the left-hand quadrant. Ultimately as the polarity of the ampere turns is reversed, the branch I in the right-hand quadrant is as follows. In making the measurements for FIG. 9 it was found that when a ½ ampere was transmitted through the saturating coil the pulses in the secondary of the pulse transformer were turned off in about 1 millisecond and when the ½ ampere through the saturating coil was interrupted the pulses in the secondary of the pulse transformer were turned on in about 4 milliseconds.

For practical purposes, only the curves I and F need be considered. Curves I and F show that for a decrease in the ampere turns through the saturating coil from about 90 to 0 the output pulse rises from about 1 volt to about 4.3 volts. Typically, a silicon controlled rectifier may be rendered conducting by about 1 volt impressed in its gating circuit. In accordance with FIG. 9, the pulse transformer would transmit a pulse with the saturating conducting between 90 ampere turns to 0. Assuming that the winding of the saturating coil has 100 turns, a pulse transformer would transmit a pulse adequate to render a typical silicon controlled rectifier conducting for generator field current below 1 ampere.

The Power Network includes the silicon controlled rectifiers SCR1, SCR2, SCR3 and SCR4. This Network is energized from a power supply transformer T3, whose primary P3 may be energized from the commercial supply and whose secondary S3 has an intermediate tap X. The silicon controlled rectifier SCR1 is connected to transmit power from the secondary S3 through the field F, when terminal X1 of the secondary S3 is positive and terminal X2 negative, in the following circuit: terminal X1, the positive and negative electrodes of SCR1, an inductor L1, the saturating coil SC1, a choke CH1, the field winding F, the intermediate tap X. When the potential of the secondary S3 is reversed, and the lower terminal X2 of S3 is positive, current can flow through SCR2 in the following circuit: terminal X2, the positive and negative electrodes of SCR2, coil L2, saturating coil SC1, the choke CH1, the field winding F, the intermediate tap X. So long as the current conducted by SCR1 or SCR2 is substantial, pulses cannot be transmitted through 1TP and the rectifiers SCR3 and SCR4 cannot be rendered conducting. The rectifiers can only be rendered conducting when the current through the field winding F and SC1 is low.

With the upper terminal X1 of S3 electrically negative and SCR3 or SCR4 conducting, current flows in the following circuit: the intermediate terminal X, the field F, another choke CH2, SC2, the positive and negative electrodes of SCR3, inductor L3, terminal X1. Correspondingly when the lower terminal X2 or S3 is negative, a current flows in an analogous circuit including SCR4. With field current flowing through SCR3 or SCR4, the conduction of SCR1 and SCR2 is suppressed by the current through the coil SC2 unless this current is relatively low.

The silicon-controlled rectifiers SCR1 and SCR2 are rendered conducting by pulses transmitted through the secondaries 2S1 and 2S2. Secondary 2S1 is connected in the gating circuit of SCR1 through a diode RX7 and a resistor R23. 2S2 is correspondingly connected in the gating circuit of SCR2. In each case, a capacitor C7, C8 and a resistor R24, R25 is connected across the main electrodes of SCR1 and SCR2 respectively. These components cooperate with the inductors L1 and L2 respectively to suppress false firing of the silicon controlled rectifiers SCR1 and SCR2. The gating circuits of SCR3 and SCR4 are similarly connected to the secondaries 1S1 and 1S2 respectively. False-firing suppressing networks C9, R26 and C10, R27 including inductors L3 and L4 are present in this case also.

A resistor R1 of moderate resistance (200 ohms) is connected between the center tap X of the secondary S3 and the junction of inductors L1 and L2 and coil SC1. A like resistor R2 is connected between the center tap X and the common junction of the positive electrode of SCR3 and SCR4 and coil SC2. These resistors provide paths excluding the field winding F in which the conduction of the silicon controlled rectifiers SCR1 or SCR2 or SCR3 or SCR4 may be maintained during the transition interval when the SCR's are commutating each other.

The operation of the apparatus will now be here explained with reference to FIGS. *5a* through *5n* and 13. FIGS. *5a* through *5n* are separate graphs but in each, voltage is plotted as a function of time and for all points along any vertical line through all graphs the instant of time is the same. FIG. *5a* shows a typical pattern voltage which initially calls for current through the field F in one direction and at the time *t*1 calls for current in the opposite direction. FIG. *5b* shows the variation of the voltage from the tachometer TG which is compared with the pattern voltage shown in FIG. *5a*. According to FIG. *5b* the motor M reverses at instant *t*2. Surrounding *t*2 there is an interval between instant *t*3 and *t*4 labelled the "Interlock Interval." During this interval *t*3–*t*4 current drawn by the field F is so small that pulses adequate for firing are transmitted both to SCR1 and SCR2 and SCR3 and SCR4. FIG. *5c* shows the difference between the pattern voltage and the tachometer voltage compared with it and this voltage is the error voltage which controls the operation of the Power Network.

FIG. *5d* shows the potential of the secondary 1S1 of transformer 1T1 as a function of time. FIG. *5e* shows the potential derived from the rectifier bridge RX1 connected to the secondary 1S1. This potential is composed of a plurality of half waves having a frequency of 120 cycles per second.

FIG. *5f* is the potential impressed between the bases 89 and 93 and 91 and 95 of each of the unijunction transistors TR5 and TR6. In both cases, the potential is derived across a Zener diode. The Zener diode limits the magnitude of the potential; typically this magnitude is of the order of 20 volts.

FIG. *5g* shows the variation of the potential on capacitor C2 as a function of time as this capacitor C2 is charged through the associated transistor TR2 and discharged through the emitter 87 and the base 91 of the associated unijunction transistor TR6. At the beginning of each period of the trapezoidal-function potentials of FIG. *5f*, the capacitor C2 begins charging to a potential such as to cause conduction through the unijunction transistor TR6 and is abruptly discharged through the primary P2 producing a saw-tooth wave. This process is repeated a decreasing number of times during the first, second and third periods because during these periods the current conducted by the transistor TR2 is of sufficient magnitude to cause the repeated charge and discharge. Near the end of each period the ramp-function potential (FIG. *5f*) decreases to zero. The potential between the bases 91 and 95 of transistor TR6 then decreases to a low magnitude and the conduction between emitter 87 and base 91 takes place at a corresponding lower magnitude of the capacitor C2 potential. For example, if the unijunction transistor TR6 conducts when the voltage between its emitter 87 and its base 91 is half the voltage between its bases 91 and 95, the conduction takes place for 10 volts on the emitter so long as the discharge voltage of the Zener diode Z2, assumed to be 20 volts, is impressed between the bases. When the voltage across the Zener diode Z2 (on the capacitor C2) drops for example to 2 volts, the conduction of the unijunction transistor TR6 takes place when the voltage between its emitter and base is only 1 volt. These low voltage discharges are represented by the small saw-teeth of FIG. *5g*.

In FIG. *5h* the voltage on capacitor C1 is plotted as a function of time. In this case the conduction through the transistor TR1 is initially so small that the capacitor reaches the magnitude at which the associated unijunction transistor becomes conducting only once during its each half period. During later periods a number of saw-teeth waves occur during each period. This number decreases as the error (FIG. *5c*) approaches zero.

FIG. *5i* presents the pulses transmitted through primary P2 of transformer 2TP as a function of time and FIG. *5j* presents the pulses transmitted through primary P1 of transformer 1TP as a function of time.

FIG. *5k* shows as a function of time the voltage impressed on SCR1 durings its operation. The full-line portions of the curves in FIG. *5k* present the voltages impressed between the positive and negative electrodes of SCR1; the broken-line portions of the curves and the full-line portions with which the broken-line portions are coextensive correspond to the voltage of the secondary S1 during the intervals during which SCR1 is conducting. During the conducting intervals the voltage between the positive and negative electrodes of SCR1 is very low (shown as zero). In plotting FIG. *5k* positive ordinates are assumed to correspond to terminal X1 of secondary S3 positive with respect to X. At the beginning of the first half period SCR1 is non-conducting and the voltage across its electrodes is substantially equal to the voltage between X1 and X. This condition is represented by the first portion of the first half-wave in FIG. *5k*. SCR1 is fired by the first pulse shown in FIG. *5i* and thereafter the voltage between its electrodes drops to a very low magnitude as represented by the horizontal line along the time axis. SCR1 once rendered conducting continues conducting independently of the number of pulses in the first half period throughout the remainder of this half period. During the interval when SCR1 is conducting, current is supplied to the field F which is inductive. By reason of the flux in the field F1 and in the reactors CH2 the conduction of SCR1 continues during the early portion of the succeeding negative half period.

Curve *5l* shows the operation of SCR2, curve *5m* shows the operation of SCR4 and *5n* shows the operation of SCR3. In each case, the full-line portion of the curve is a plot of the voltage across the electrodes of the silicon-controlled rectifier as a function of time and the broken-line portion of the curve and its coextensive full-line portion is a plot of the voltage of the terminals X1 or X2 of the secondary S3 of transformer T3 with reference to terminal X. The first portion of the first half wave of FIG. *5l* shows the carry-over conduction of SCR2 which, it may be assumed, was rendered conducting during the half period preceding the one shown in the graph. This carry-over conduction is interrupted by the rendering conducting of SCR1 during the first half period as shown in FIG. *5k*. During the second half period SCR1 continues to conduct until SCR2 is rendered conducting. SCR2 then continues to conduct until SCR1 is rendered conducting during the third half period.

At this time the error signal (FIG. 5*c*) abruptly changes polarity decreasing the conduction of transistor TR2 charging C2 so that the saw-tooth wave (FIG. 5*g*) has a smaller slope than earlier during the operation. SCR2 is then rendered conducting very late in the fourth half period of the potential at instant *t*5; SCR1 continues to conduct during this half period until SCR2 is rendered conducting. During this interval the potential of X1 relative to X is negative but this negative potential is counteracted by the potential arising from the decay of flux in the field F and in the choke CH1. The conduction of SCR1 throughout the fourth half period causes the power source to absorb a large portion of the energy of the flux which had been built up in field winding F. SCR2 continues to conduct from late in the fourth half period during the fifth half period until SCR1 is rendered conducting. During this half period the potential of X2 is negative with respect to the intermediate tap X. A large portion of the inductive energy built up is absorbed during the fifth half period.

During the fifth half period, the current in the field F which also flows through the saturating coil SC1 for transformer TP1 is reduced to so low a magnitude that the pulses impressed on the primary P1 of transformer TP1 are of substantial amplitude adequate to render SCR4 and SCR3 conducting. During the seventh half period, the potential of the intermediate tap is positive with respect to X2. This is the potential which is impressed on SCR4. A firing pulse is impressed on SCR4 and, if there is a path through which SCR4 can conduct, SCR4 would be rendered conducting. Current is still flowing through field F from right to left in FIG. 13 and this current is opposite to the direction in which SCR4 conducts, SCR4 then cannot conduct through the field F. But SCR4 can conduct through the resistor R2 in series with it. This conducting path is as follows: X, R2, SCR4, inductor L4, X2. SCR4 then in part conducts through the resistor. The current conducted by SCR4 is necessarily low because the resistor has a substantial resistance of the order of 200 ohms. In addition, SCR4 is connected in circuit with CH1 in which flux has been built up by the conduction through SCR1 and SCR2. This circuit is as follows: common junction of CH1 and CH2, CH2, SC2, SCR4, L4, SCR2, L2, SC1, CH1. The decay of flux in CH1 tends to drive current through SCR4 and SCR2 which is at this time conducting. There is no short circuit across the secondary S3 because of the action of the reactors CH1 and CH2 and also because of the resistance between the intermediate tap and the positive electrode of SCR4. The conduction of SCR4 particularly under the potential supplied by CH1 tends to absorb energy from the field winding F and further reduces the current flowing through it.

During the seventh half period SCR2 continues to conduct until SCR1 is rendered conducting. The current in the field F is now reversed and SCR1 ceases conducting during the eighth half period after SCR3 begins conducting. The conduction of SCR4 continues during the seventh half period and during a portion of the eighth until SCR3 is rendered conducting. Current now flows through SCR3 during the eighth half period and a portion of the ninth until SCR4 is again rendered conducting. At this point SCR1 and SCR2 are nonconducting and the current from SCR3 and SCR4 flows through the field winding F and through the choke CH2. This flow continues until the error is reduced substantially to zero. The generator then operates with a field current corresponding to the desired motor armature potential.

As shown in FIGS. 5*a* through 5*n* the transition from conduction of current through winding F of one polarity to that of the other takes place in about one period of the supply. In a typical situation, this transition would take place in a number of periods of the supply but one period is shown in FIGS. 5*a* through 5*n* in the interest of clarity.

FIG. 10 is a curve showing the field current plotted vertically as a function of the error voltage plotted horizontally. The upper and lower branches U and L correspond to field current in opposite directions. The displacement to the right or left of one of the branches relative to the other may be changed by changing the biasing resistance R15 connected to the emitters 71 and 73 of the transistors TR1 and TR2 in a manner corresponding to curves A or B of FIG. 8. It is desirable to maintain high gain near zero and for this purpose the bias resistance is set so that the branches U and L are shifted so that they are together and that there is no sharp bend in the region of zero voltage.

FIG. 11 is another curve in which the field current is plotted vertically as a function of the error voltage plotted horizontally. As shown in FIG. 11 the operation near zero is along the path marked with the arrows. The operation for each of the two branches U and L of the curve is in the direction from which the field current is approached; that is, for decreasing negative field current, the operation follows the lower arrow and for decreasing positive field current the operation follows the upper arrow. To prevent high "toggle" current it is essential that the sharp bend of the curve should not cross the zero axis.

In FIG. 12, and oscillographs, taken with apparatus in accordance with this invention, voltage of the generator G extends vertically and time horizontally. This oscillograph was produced by impressing from a wave generator square waves, triangular waves and sinusoidal waves as error signal in the apparatus. The frequency of the waves was about .5 cycle per second. The output waves with an amplitude of about 135 volts peak-to-peak are seen to have the same wave form as the input waves. This demonstrates the reliability of the apparatus in accordance with this invention.

The following brief discussion is presented for the purpose of aiding those skilled in the art in practicing this invention. The basic requirements demanded of the apparatus according to this invention are:

(1) Minimum deadband
(2) Stable operating point
(3) Absence of short-circuits
(4) High gain
(5) Integral stabilizing networks
(6) Short-time response The apparatus according to this invention meets these requirements.

Figure 2:
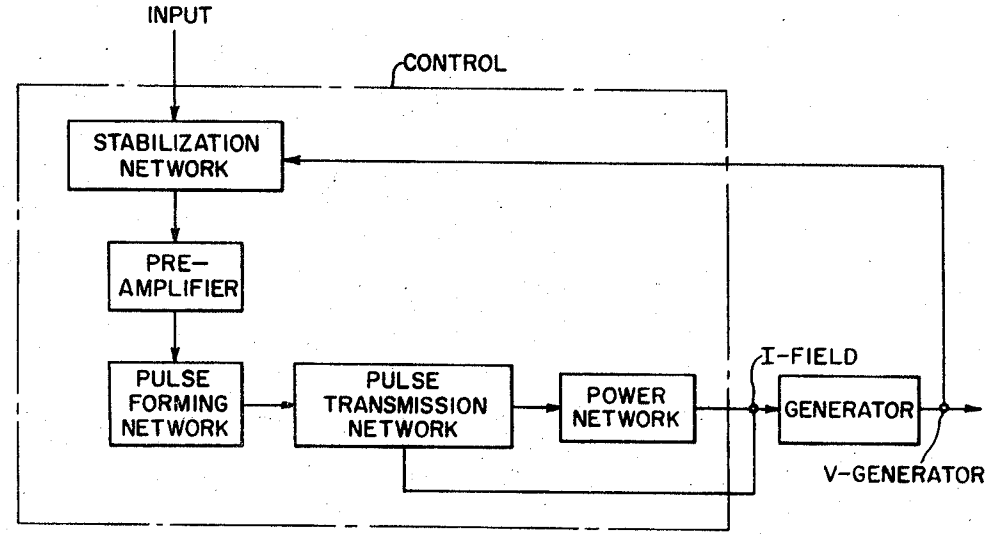
FIG. 2 is a block diagram showing the principal components of the control in accordance with this invention.

The components of this invention are presented in FIG. 2. The Stabilization Network modifies the frequency response to achieve the required performance in the closed-loop system. Two curves are shown in FIG. 6. Curve G1 shows the unstabilized response, and curve G2 the stabilized response. Marked stabilization is achieved with the small, inexpensive components used in the practice of this invention.

This Pre-Amplifier (FIG. 3) determines the charging rates of the capacitors C1 and C2 in the Pulse Forming Network. The zero-signal charging current is adjustable by the variable resistor R15 (150 ohm) to set the width of the low-gain region. Temperature compensation is provided by the transistors TR3 and TR4 to maintain an almost constant zero-signal current from −10° C. to 70° C. ambient. The high resistors (39K) provide an "end of cycle" pulse for maximum rate of field decay. The characteristics of the Pre-Amplifier is shown in FIG. 7. In FIG. 8 is shown the effect on the gain characteristic of various biasing arrangements.

This Pulse Forming Network generates the pulses required to trigger the silicon-cotrolled rectifiers SCR1, SCR2, SCR3, SCR4. The Transmission Network delivers the pulses to the silicon controlled rectifiers. Pulses are delivered to the proper rectifiers SCR1 through SCR4 if the primary is being pulsed and the saturating coil SC1 or SC2 is not saturating the pulse transformer 1TP or 2TP. Two devices are used, each sensing one direction of current and inhibiting pulses to the opposite set of rectifiers until the current falls below a prescribed value. If one set of rectifiers (SCR1 and SCR2) is being triggered, the opposite set (SCR3 and SCR4) cannot be triggered until the field or load current is low. This is an electronic interlock analogous to a mechanical interlock between two contactors whose simultaneous operation would cause a short circuit. In FIG. 9 is shown the output pulse amplitude as a function of ampere-turns in the saturating coils (SC1 or SC2). The Transmission Network is constructed so that its volt-seconds are coordinated with the capacitor discharge time to completely discharge the capacitors C1 and C2 between pulses. The pulse amplitude is thereby increased The Power Network is shown in FIG. 3. The reactors CH1 and CH2 hold down the magnitude of short-circuit current until the Transmission Network takes over (about 1 cycle). Also, RLC *dv/dt* reducers, C7–R24–L1,

C8–R–25–L2

C9–R26–L3, C10–R27–L4, are added to prevent false firing the silicon controlled rectifiers.

In FIG. 10 the output field current is shown as a function of the input or error voltage. The data was taken for each current polarity separately. The curves can be shifted to the right or left independently with the bias as in FIG. 8, curve A; or, they can be pushed apart or pulled together with the bias as in FIG. 8, curve C. To maintain high gain near zero, it is desirable to pull the curves together bringing the sharp bend in the curve near zero volts. In FIG. 11 is shown the actual gain characteristic near zero for a very slowly varying input voltage. There is no mixing of currents. Operation near zero is along one path or the other depending on the direction of approach (bistable region). To prevent a high "toggle" current, it is important to prevent the sharp bend for crossing the zero axis. Allowance must be made for drift of the Pre-Amplifiers. Two factors affect the magnitude of this "toggle" current. They are: the zero signal bias, and the resistors R1 and R2 in parallel with the inductive load ($\bar{I}$ max. approximately equals E peak/R). R1 and R2 must be small enough to insure firing over the entire range required. The point at which the operation shifts from one curve to the other is affected by the saturating coils SC1 and SC2. The coils should saturate near the current at the bend. Saturating at higher levels causes excessive shifting of operation between the curves and saturating at too low a level widens the low-gain region. In FIG. 8, it can be seen that curve B bias results in high gain being maintained nearly down to zero making it easy to maintain a narrow gain region even with a low saturating current.

While the best embodiment known at this time has been dsclosed herein, many modifications thereof are feasible. This invention then is not to be restricted except insofar as is necessitated by the spirit of the prior art.

I claim as my invention:

1. A variable-speed reversible drive including a generator for controlling said drive having a field winding, alternating-current power-supply means, first valve means having first control means, second valve means having second control means, a first control unit having primary and secondary winding means and saturating winding means, a second control unit unit also having primary and secondary winding means and saturating winding means, means connecting said supply means and said first valve means, in circuit with said field winding and said saturating winding means of said second unit to conduct current of one polarity through said field winding and through said last-named saturating winding means, means connecting said supply means and said second valve means in circuit with said field winding and said saturating winding means of said first unit to conduct current of the opposite polarity through said field winding and said last-named saturating winding means, means connecting said secondary winding means of said first unit to said first control means to control the current conducted by said first valve means, means connecting said secondary winding means of said second unit to said second control means to control the current conducted by said second valve means, and means connected to said primary winding means of said first and second units for selectively supplying control signals to said first primary winding means to control the conduction of the first valve means and to said second primary winding means to control the conduction of the second valve means, the current of either polarity through said field winding and through the associated saturating winding means, when of normal magnitude, saturating the control unit for the valve means capable of conducting the current of the opposite polarity to suppress transmission of control signals from the primary winding means of the unit associated with said last-named valve means but when at low magnitude, leaving said last-named control unit unsaturated to permit the transmission of control signals from said last-named primary winding means and the conduction of said last-named valve means.

2. The drive of claim 1 including impedance means connected in power-supply transmission relationship with each of the valve means providing a path for transmission of current, during the transition interval when both valve means are conducting, for the one of the valve means which was prior to the transition interval non-conducting.

3. The method of controlling the supply of current through an inductive load, the said current being selectively variable both in magnitude and in polarity, the said method being practiced with apparatus including first and second valve means selectively controllable to set the magnitude and polarity of the said current, the said first valve means conducting load current of one polarity and the said second valve means conducting load current of the opposite polarity, the said method comprising setting said first valve means to conduct load current of substantial magnitude and of said one polarity, automatically causing said last-named load current to control said second valve means to suppress the conduction of current of the opposite polarity, setting said first valve means to reduce the load current of said one polarity to a low magnitude, automatically causing said reduced load current to control said second valve means to permit conduction of current of said opposite polarity as well as current of said one polarity, setting said second valve means to increase the magnitude of said current of said opposite polarity to a substantial magnitude, and automatically causing said last AD current of said opposite polarity to suppress conduction of current of said one polarity through said first valve means.

4. Apparatus for supplying current to an inductive load including first valve means connected to conduct current of one polarity through said load and second valve means connected to conduct current of the opposite polarity through said load, selective control means for said first and second valve means to actuate said first and second valve means as selected to conduct current of selectable magnitude and selectable first or second polarity, through said load, said control means including first actuating means, when selected, to actuate said first valve means to conduct current of said one polarity through said load and second actuating means, when selected, actuating said second valve means to conduct current of said opposite polarity through said load, and means connecting said load in interlocking relationship with said first and second actuating means, responsive to the conduction of current, of either polarity through said load, to set said valve means conducting the current of the opposite polarity to block current of said other polarity when said current of said first-named polarity is substantial and to pass current of said other polarity together with the current of said first-named polarity when said current of said first-named polarity is low.

5. The drive of claim 1 wherein the power supply means has at least a pair of terminals and wherein the first valve means is connected in circuit with the field winding and the terminals to supply current of one polarity through the field winding and the second valve means is connected in circuit with the field winding and the terminals to supply current of the opposite polarity through said field winding, and wherein each valve means is in addition connected across said terminals through impedance which is high compared to the impedance of said field winding, said impedance providing an alternative path for current through the valve means connected in circuit with it.

6. The drive of claim 5 wherein the power supply includes end terminals and an intermediate terminal and each valve means includes a first valve and a second valve, the first valve of the first valve means and of the second valve means each being connected in circuit with one end terminal, the field winding and the intermediate terminal to conduct currents of opposite polarity respectively through the field winding, and the second valve of the first and second valve means being connected in circuit with the other end terminals, the field winding and the intermediate terminal, to conduct currents of opposite polarities respectively through the field winding.

7. The method of controlling the supply of energizing current to a drive for a vehicle which is selectively moved upwardly or downwardly and is selectively stopped and whose speed is selectively varied, the said movement being effected by selective control of said energizing current through the drive, the said method being practiced with apparatus including first and second valve means selectively controllable to set the magnitude and polarity of said energizing current, the said first valve means conducting energizing current of one polarity through said drive and the said second valve means conducting energizing current of the opposite polarity through said drive, the said method comprising, setting said first valve means to conduct energizing current of substantial magnitude and of said one polarity when the required operation of said vehicle, as aforesaid, imposes a requirement for said current of said substantial magnitude and said one polarity, automatically causing said last-named energizing current to control said second valve means to suppress the conduction of current of said opposite polarity, on the occurrence of a change in the required operation of said vehicle demanding energizing current of said opposite polarity setting said first valve means to gradually reduce the energizing current of said one polarity to a low magnitude, automatically causing said reduced energizing current to control said second valve means to permit conduction of current of said opposite polarity as well as current of said one polarity, setting said second valve means to increase the magnitude of said current of said opposite polarity to a substanstial magnitude, and automatically causing said current of said opposite polarity and of said substantial magnitude to suppress conduction of energizing current through said first valve means.

References Cited

UNITED STATES PATENTS

| | | | |
|---|---|---|---|
| 3,060,367 | 10/1962 | Richards et al. | 318—513 |
| 3,209,227 | 9/1965 | Berman et al. | 318—513 |
| 3,189,196 | 6/1965 | Carl et al. | 318—513 |
| 3,226,624 | 12/1965 | Novak et al. | 318—513 |

ORIS L. RADER, Primary Examiner

K. L. CROSSON, Assistant Examiner

U.S. Cl. X.R.

318—158, 284, 300, 513